United States Patent [19]

Ogawa et al.

[11] Patent Number: 5,563,228
[45] Date of Patent: Oct. 8, 1996

[54] METHOD FOR THE PREPARATION OF POLYHETEROSILOXANES

[75] Inventors: Takuya Ogawa, Kanagawa, Japan; Toshio Suzuki, Midland, Mich.

[73] Assignee: Dow Corning Asia, Ltd., Tokyo, Japan

[21] Appl. No.: 383,131

[22] Filed: Feb. 3, 1995

[30] Foreign Application Priority Data

Feb. 25, 1994 [JP] Japan ................................. 6-028276

[51] Int. Cl.⁶ .......................... C08G 77/06; C08G 77/08
[52] U.S. Cl. ...................... 528/20; 528/39; 528/10; 528/12; 528/31; 528/32
[58] Field of Search ........................ 528/39, 10, 20, 528/12, 31, 32

[56] References Cited

U.S. PATENT DOCUMENTS

| | | | |
|---|---|---|---|
| 2,676,182 | 4/1954 | Daudt et al. | 260/448.2 |
| 2,716,656 | 8/1955 | Boyd | 528/39 |
| 2,814,601 | 11/1957 | Currie et al. | 260/29.1 |
| 3,625,934 | 12/1971 | Rinse | 528/39 |
| 4,238,590 | 12/1980 | Scholze | 528/5 |
| 4,495,322 | 1/1985 | Liebler | 524/198 |
| 4,746,366 | 5/1988 | Philipp et al. | 106/287.19 |
| 5,248,706 | 9/1993 | Panster et al. | 523/113 |
| 5,357,024 | 10/1994 | Leclaire | 528/39 |

FOREIGN PATENT DOCUMENTS

| | | |
|---|---|---|
| 61-195129 | 8/1986 | Japan. |
| 5-078489 | 8/1993 | Japan. |

*Primary Examiner*—Margaret W. Glass
*Attorney, Agent, or Firm*—James E. Bittell

[57] ABSTRACT

The invention is a method for the preparation of organic solvent-soluble polyheterosiloxanes containing $MO_2$ (M=Ti or Zr) and $SiO_2$ units. A compound $MA_4$ (M=Ti or Zr, A=hydrolyzable group) and a compound $Si(OR)_4$ (R=hydrocarbon group or alkali metal atom) are hydrolyzed and condensed in the presence of a carboxylic acid, a phenol, or a diketone. This is followed by the addition of an organosilane $R^1_3SiX$ ($R^1$=hydrogen or hydrocarbon group, X=hydrolyzable group) and hydrolysis and condensation.

6 Claims, No Drawings

METHOD FOR THE PREPARATION OF POLYHETEROSILOXANES

The invention relates to a method for the preparation of solvent-soluble polyheterosiloxanes whose essential constituent moieties are the $MO_2$ and $SiO_2$ units, where M represents the titanium atom or zirconium atom. More specifically, the invention relates to a method for the preparation of polyheterosiloxanes that are useful as additives for improving the properties of polysiloxanes.

$SiO_2$ unit-containing polysiloxane has long been known in the form of the so-called MQ resins, which are composed of trimethylsilyl and $SiO_2$ units. Polysiloxanes of this type are soluble in the usual organic solvents and are typically prepared by the following methods:

(1) neutralization of water-soluble silicate, e.g., water glass, etc., followed by the addition of excess trimethylchlorosilane (for example, U.S. Pat. Nos. 2,676,182 and 2,814,601);

(2) cohydrolysis of tetraalkoxysilane and trimethylchlorosilane in the presence of acid catalyst (for example, Japanese Patent Application Laid Open [Kokai] Number Sho 61-195129 [195,129/1986]).

On the other hand, polyheterosiloxanes contain, in addition to silicon, other metal atoms incorporated with the siloxane units through covalent bonding. The polyheterosiloxanes have been the subject of extensive research because their physical and chemical properties are very different from those of ordinary polysiloxanes.

So-called "sol-gel" methods are well known for the preparation of polyheterosiloxanes. In these methods, a mixture of alkoxysilane and $M(OR)_n$ (M=metal atom, but not silicon; R=alkyl; $2 \leq n \leq 6$) is hydrolyzed and condensed in organic solvent and the solvent is subsequently removed. These methods can be used to prepare polyheterosiloxanes containing various metals, for example, titanium, zirconium, aluminum, tin, vanadium, and niobium. However, the management of these methods is quite problematic due to the frequent occurrence of phase separation and cracking during solvent removal. In addition, since the product after solvent removal is no longer soluble in organic solvents, there are limitations on the processing technologies applicable to the obtained polyheterosiloxane, and as a result the utilization of these products has been centered on coating applications. While Japanese Laid Open Patent Application Number Hei 5-78489 [78,489/1993] by Abe, et al., describes the synthesis of polyzirconosiloxanes, the described reaction uses special precursors, such as bis(2,4-pentanedionato)zirconium diisopropoxide and bis(2,4-hexanedionato)zirconium diisopropoxide.

Thus, a simple method for the preparation of solvent-soluble polyheterosiloxanes whose essential constituent moieties are the $MO_2$ (M represents the titanium atom or zirconium atom) and $SiO_2$ units has not heretofore been reported.

SUMMARY OF THE INVENTION

The invention is a method for preparation of solvent-soluble polyheterosiloxanes whose essential constituent moieties are the $MO_2$ and $SiO_2$ units where M represents the titanium atom or zirconium atom. The invention specifically consists of a method for the preparation of polyheterosiloxanes that comprises:

a procedure in which a metal compound with formula (1)

$$MA_4 \tag{1}$$

where M represents the titanium atom or zirconium atom and A represents halogen, alkoxy or acyloxy groups, is hydrolyzed and condensed in the presence of at least one compound selected from carboxylic acids, phenols, and diketones, hydrolyzing and condensing an $SiO_2$ unit-forming precursor; and a procedure comprising the addition of organosilane with formula (2)

$$R^1_3 SiX \tag{2}$$

where the groups $R^1$ in the formula independently represent hydrogen, alkyl, substituted alkyl, alkenyl, aryl, or substituted aryl groups, and X represents hydroxy, alkoxy, acyloxy, or acylamide groups; and hydrolysis and condensation.

DETAILED DESCRIPTION OF THE INVENTION

The metal compound $MA_4$ used in the present invention is a precursor that yields the $MO_2$ unit (M=titanium or zirconium). $MA_4$ comprises the halides, alkoxides, and acyloxides of the metals, titanium and zirconium, and is specifically exemplified by titanium tetrachloride, tetraethoxytitanium, tetrapropoxytitanium, tetraisopropoxytitanium, tetrabutoxytitanium, tetraacetoxytitanium, zirconium tetrachloride, tetraethoxyzirconium, tetrapropoxyzirconium, tetraisopropoxyzirconium, and tetrabutoxyzirconium. Carbon-containing A preferably contains no more than 4 carbon atoms.

The $SiO_2$ unit-forming precursors include the solvent-soluble silicates, among which the use of $Si(OR)_4$ or its partial hydrolyzates is recommended where R represents an alkali metal atom, alkyl, substituted alkyl, alkenyl, aryl, substituted aryl, and acyl groups, wherein the carbon-containing groups preferably contain no more than 6 carbon atoms. Specific examples thereof are tetramethoxysilane, tetraethoxysilane, tetra-n-propoxysilane, tetra-n-butoxysilane, tetrakis(2-methoxyethoxy)silane, tetraallyloxysilane, tetraphenoxysilane, silicon tetraacetate, sodium orthosilicate, and the partial hydrolyzates of the preceding. Tetramethoxysilane and tetraethoxysilane are preferred from the standpoint of economic efficiency and ease of acquisition.

The crucial feature of the present invention is the process in which the metal compound $MA_4$ is hydrolyzed and condensed in the presence of at least 1 compound selected from carboxylic acids, phenols, and diketones. The presence of such compounds makes possible control of hydrolysis and condensation of the metal compound $MA_4$ so as to yield the desired polyheterosiloxane. Carboxylic acids usable for this purpose are exemplified by acetic acid, propionic acid, n-butyric acid, acrylic acid, methacrylic acid, benzoic acid, 2-methylbenzoic acid, 4-methylbenzoic acid, phthalic acid, and terephthalic acid. Acetic acid, propionic acid, acrylic acid, methacrylic acid, and benzoic acid are preferred for their ease of acquisition. Subject phenols are exemplified by phenol, the chlorophenols, and the cresols. Subject diketone is exemplified by acetylacetone, dipivaloylmethane, and benzoylacetone. Acetylacetone and its derivatives are preferred for their ease of acquisition. These compounds will be used in different amounts depending on the nature of the compound used, but the amount is preferably at least 10 mole % to no more than 400 mole % based on the metal compound $MA_4$. The hydrolysis and condensation of $MA_4$ will not be satisfactorily controlled at less than 10 mole %, while any quantity added in excess of 400 mole % is simply superfluous.

Water is used in this hydrolysis and condensation process preferably in the minimum quantity necessary to hydrolyze and condense all the hydrolyzable groups in the metal compound $MA_4$ and $SiO_2$ unit-forming compound, i.e., at least 80 mole % water but no more than 150 mole % water based on the stoichiometric amount. When the water quantity is outside this range, hydrolysis/condensation will be inadequate or an insoluble polymer will be produced. It is recommended that hydrolysis and condensation be run in the presence of a suitable organic solvent. Any organic solvent capable of dissolving the metal compound $MA_4$ can be used for this purpose, and water-soluble organic solvents such as tetrahydrofuran, 1,4-dioxane, and dimethylformamide are preferred.

After formation of the $MO_2$ (M=titanium or zirconium) and $SiO_2$ units, the method continues with the addition of organosilane $R^1_3SiX$ where the groups $R^1$ independently represent hydrogen, alkyl, substituted alkyl, alkenyl, aryl, or substituted aryl groups; X represents hydroxy, alkoxy, acyloxy, or acylamide groups. Hydrolysis and condensation then produces the solvent-soluble polyheterosiloxane. Carbon-containing substituents $R^1$ preferably contain no more than 6 carbon atoms. The substituent $R^1$ is specifically exemplified by the hydrogen atom and by methyl, ethyl, n-propyl, n-hexyl, chloromethyl, vinyl, and phenyl. Hydrogen, methyl, vinyl, and phenyl are preferred from the standpoint of economic efficiency. Carbon-containing substituents X preferably contain no more than 3 carbon atoms. Preferred as X are hydroxy, methoxy, ethoxy, acetoxy, and acetamide.

The organosilane is specifically exemplified by trimethylhydroxysilane, trimethylmethoxysilane, trimethylethoxysilane, trimethylsilyl acetate, trimethylsilylacetamide, dimethylhydroxysilane, dimethylethoxysilane, dimethylsilyl acetate, dimethylsilylacetamide, vinyldimethylhydroxysilane, vinyldimethylmethoxysilane, vinyldimethylethoxysilane, vinyldimethylsilyl acetate, vinyldimethylsilylacetamide, phenyldimethylhydroxysilane, phenyldimethylethoxysilane, phenyldimethylacetoxysilane, diphenylmethylhydroxysilane, diphenylmethylethoxysilane, diphenylvinylhydroxysilane, and diphenylvinylethoxysilane. While the quantity of addition for this silane is not critical, it is preferably used in an amount corresponding to at least 10 mole % of the amount of metal compound $MA_4$ used.

No particular restrictions apply to the composition of the final polyheterosiloxane product, but the $MO_2$ unit to $SiO_2$ unit ratio (M)/(Si) preferably falls in the range of $0.01 \leq (M)/(Si) \leq 100$ expressed as the mole fraction.

The method of the invention for the preparation of polyheterosiloxane encompasses both the simultaneous formation of the $MO_2$ and $SiO_2$ units and the stepwise formation of these units. Stepwise formation is preferred in order to stabilize the quality of the polyheterosiloxane product. One example of a stepwise formation method consists of the hydrolysis and condensation of metal compound $MA_4$ using the specified amount of water in the presence of at least 1 compound selected from carboxylic acids, phenols, and diketones; then addition of tetraalkoxysilane and another hydrolysis and condensation; and finally addition of organosilane $R^1_3SiX$ and hydrolysis and condensation. The reaction temperature in subject preparative processes is preferably at least −80° C. to no more than 100° C. and more preferably at least −80° C. to no more than 50° C.

The invention is explained in greater detail below through working examples, but these examples do not limit the invention.

EXAMPLE 1

Zirconium tetrapropoxide (2.5 g, 7.65 mmol) and 1.8 g acetic acid were dissolved in 10 mL tetrahydrofuran and cooled with ice in a cooling bath. To the solution was gradually added dropwise a mixture of 275 mg (15.3 mmol) water and 5 mL tetrahydrofuran. After the solution had been stirred for 10 minutes, 2.3 g (15.1 mmol) tetramethoxysilane was added, and a tetrahydrofuran (5 mL) solution of 550 mg (30.6 mmol) water was then gradually added dropwise. The cooling bath was removed, and the solution was stirred for 1 hour at room temperature. Trimethylsilyl acetate (4.3 g) was subsequently added and the solution stirred for another 2 hours. After this, the solvent and unreacted trimethylsilyl acetate were removed to yield 3.10 g of a light yellow solid.
IR: 1100 $cm^{-1}$ (Si—O—Si), 918 $cm^{-1}$ (Zr—O—Si).
$^1H$ NMR ($CDCl_3$ solvent, $CHCl_3$ standard, delta=7.24 ppm): 0.11 (Si—$CH_3$), 2.10 (CO—$CH_3$), 1.50–2.50 ($OC_3H_7$).
$^{29}Si$ NMR ($CD_3COCD_3$ solvent, TMS standard, delta=0 ppm): 8.6 (Si—$CH_3$), −92 to −113 ($SiO_2$, $SiOCH_3$).

EXAMPLE 2

A reaction was run as in Example 1 using 0.67 g methacrylic acid in place of the 1.8 g acetic acid. The product in this case was 3.20 g of a light yellow solid.
IR: 1100 $cm^{-1}$ (Si—O—Si), 920 $cm^{-1}$ (Zr—O—Si).
$^1H$ NMR ($CDCl_3$ solvent, $CHCl_3$ standard, delta=7.24 ppm): 0.11 (Si—$CH_3$), 1.50–2.50 ($OC_3H_7$), 5.20–6.40 ($CH_2$=C($CH_3$)).
$^{29}Si$ NMR ($CD_3COCD_3$ solvent, TMS standard, delta=0 ppm): 8.7 (Si—$CH_3$), −90 to −113 ($SiO_2$, $SiOCH_3$).

EXAMPLE 3

Zirconium tetrapropoxide (1.3 g) and 0.4 g acetylacetone were dissolved in 8 mL tetrahydrofuran and cooled with ice in a cooling bath. To the solution was gradually added dropwise a mixture of 139 mg water and 5 mL tetrahydrofuran. After the solution had been stirred for 10 minutes, 2.3 g tetramethoxysilane was added, and a tetrahydrofuran (4 mL) solution of 550 mg water and 4 70 mg acetic acid was then gradually added dropwise. The cooling bath was removed, and the solution was stirred for 4 hours at room temperature. Trimethylsilyl acetate (4.3 g) was added and stirring continued for another 14 hours. After this, the solvent and unreacted trimethylsilyl acetate were removed to yield 1.51 g of a light yellow solid.
IR: 1100 $cm^{-1}$ (Si—O—Si), 922 $cm^{-1}$ (Zr—O—Si).
$^1H$ NMR ($CD_3COCD_3$ solvent, TMS standard, delta=0 ppm): 0.13 (Si—$CH_3$), 2.10 (CO—$CH_3$, trace), 1.50–2.20 ($OC_3H_7$).
$^{29}Si$ NMR ($CD_3COCD_3$ solvent, TMS standard, delta=0 ppm): 8.1 (Si—$CH_3$), −90 to −115 ($SiO_2$, $SiOCH_3$).

EXAMPLE 4

Titanium tetrabutoxide (3.8 g) and 0.67 g acetic acid were dissolved in 8 mL tetrahydrofuran and cooled with ice in a cooling bath. A mixture of 390 mg water and 5 mL tetrahydrofuran was gradually added dropwise. After stirring for 30 minutes, 1.81 g tetramethoxysilane was added, and a tetrahydrofuran (4 mL) solution of 430 mg water was then gradually added dropwise. The cooling bath was removed, and the solution was stirred for 4 hours at room temperature. Trimethylsilyl acetate (3.4 g) was added and the stirring continued for another 15 hours. After this, the solvent and unreacted trimethylsilyl acetate were removed to yield 2.78 g of a yellow liquid.

IR: 1100 cm$^{-1}$ (Si—O—Si), 925 cm$^{-1}$ (Ti—O—Si).

$^1$H NMR (CD$_3$COCD$_3$ solvent, TMS standard, delta=0 ppm): 0.20 (Si—CH$_3$), 0.90 (CH$_3$), 1.10–2.20 (OC$_3$H$_6$, CO—CH$_3$), 3.70 (OCH$_3$).

$^{29}$Si NMR (CD$_3$COCD$_3$ solvent, TMS standard, delta=0 ppm): 11.1 (Si—CH$_3$), −95 to −115 (SiO$_2$, SiOCH$_3$).

EXAMPLE 5

Titanium tetrabutoxide (2.3 g) and 0.40 g acetic acid were dissolved in 5 mL tetrahydrofuran and cooled with ice in a cooling bath. A mixture of 240 mg water and 5 mL tetrahydrofuran was gradually added dropwise. After the solution had been stirred for 30 minutes, 1.1 g tetramethoxysilane was added, and a tetrahydrofuran (4 mL) solution of 270 mg water was gradually added dropwise. The cooling bath was removed, and the solution was stirred for 4 hours at room temperature. An ether solution of 2.0 g trimethylhydroxysilane was added and the stirring continued for another 15 hours. After this, the solvent and unreacted trimethylhydroxysilane were removed to yield 1.67 g of a yellow liquid.

IR: 1100 cm$^{-1}$ (Si—O—Si), 922 cm$^{-1}$ (Ti—O—Si).

$^1$H NMR (CD$_3$COCD$_3$ solvent, TMS standard, delta=0 ppm): 0.20 (Si—CH$_3$), 0.92 (CH$_3$), 1.10–2.30 (OC$_3$H$_6$, CO—CH$_3$), 3.70 (OCH$_3$).

$^{29}$Si NMR (CD$_3$COCD$_3$ solvent, TMS standard, delta=0 ppm): 11.3 (Si—CH$_3$), −95 to −115 (SiO$_2$, SiOCH$_3$).

COMPARATIVE EXAMPLE 1

A reaction was run exactly as in Example 1, with the single exception that the 1.8 g acetic acid was omitted. In this case, a white precipitate was produced during the dropwise addition of the mixture of water and tetrahydrofuran. This precipitate was insoluble in organic solvents.

The invention method for the preparation of polyheterosiloxanes is simple and straightforward, and, because it yields a solvent-soluble product, it broadens the scope of the applicable processing technologies. Moreover, because the polyheterosiloxanes according to the invention contain the TiO$_2$ or ZrO$_2$ units in the molecule, they are useful as additives for improving the properties of polysiloxanes, for example, the heat resistance.

We claim:

1. A method for preparing solvent-soluble polyheterosiloxanes, the method comprising:

first hydrolyzing and condensing a metal compound having the formula

MA$_4$ where M represents the titanium atom or zirconium atom, and A represents a hydrolyzable group selected from the group consisting of halogen, alkoxy and acyloxy groups, in the presence of 0.1 to 4 mole, per mole of metal compound, of at least one compound selected from the group consisting of carboxylic acids, phenols, and diketones with about 1.0 to 1.5 times the stoichiometric amount of water necessary to hydrolyze and condense all the hydrolyzable groups in the metal compound;

then adding to the hydrolyzed and condensed metal compound, an SiO$_2$ unit-forming precursor selected from the group consisting of silicate and partial hydrolyzate of a silicate where the silicate has the formula Si(OR)$_4$ where R is selected from the group consisting of an alkali metal, alkyl, alkenyl, aryl, and acyl groups and about 1.0 to 1.5 times the stoichiometric amount of water necessary to hydrolyze and condense all the hydrolyzable groups in the SiO$_2$ unit-forming precursor;

then adding to the hydrolyzed and condensed metal compound and SiO$_2$ unit-forming precursor, an organosilane having the formula R$^1_3$SiX where each R$^1$ is independently selected from the group consisting of hydrogen, alkyl, alkenyl, and aryl groups, and X is selected from the group consisting of hydroxy, alkoxy, acyloxy, and acylamide groups; and then hydrolyzing and condensing the organosilane.

2. The method of claim 1 wherein 0.01 to 100 mole of SiO$_2$ unit-forming precursor is added per mole of the metal compound hydrolyzed and condensed.

3. The method of claim 2 wherein at least 0.1 mole of the organosilane is added per mole of the metal compound hydrolyzed and condensed.

4. A method for preparing solvent-soluble polyheterosiloxanes, the method comprising:

simultaneously hydrolyzing and condensing a metal compound having the formula

MA$_4$ where M represents the titanium atom or zirconium atom, and A represents a hydrolyzable group selected from the group consisting of halogen, alkoxy and acyloxy groups and an SiO$_2$ unit-forming precursor selected from the group consisting of silicate and partial hydrolyzate of a silicate where the silicate has the formula Si(OR)$_4$ where R is selected from the group consisting of an alkali metal, alkyl, alkenyl, aryl, and acyl groups, in the presence of 0.1 to 4 mole, per mole of metal compound, of at least one compound selected from the group consisting of carboxylic acids, phenols, and diketones with about 1.0 to 1.5 times the stoichiometric amount of water necessary to hydrolyze and condense all the hydrolyzable groups in the metal compound and SiO$_2$ unit-forming precursor;

then adding to the hydrolyzed and condensed metal compound and SiO$_2$ unit-forming precursor, an organosilane having the formula R$^1_3$SiX where each R$^1$ is independently selected from the group consisting of hydrogen, alkyl, alkenyl, and aryl groups, and X is selected from the group consisting of hydroxy, alkoxy, acyloxy, and acylamide groups; and then hydrolyzing and condensing the organosilane.

5. The method of claim 4 wherein 0.01 to 100 mole of SiO$_2$ unit-forming precursor is hydrolyzed and condensed per mole of the metal compound hydrolyzed and condensed.

6. The method of claim 5 wherein at least 0.1 mole of the organosilane is added per mole of the metal compound hydrolyzed and condensed.

* * * * *